June 23, 1959  R. D. SOMMER  2,892,143
GENERATOR REGULATING APPARATUS
Filed Nov. 7, 1957  2 Sheets-Sheet 1
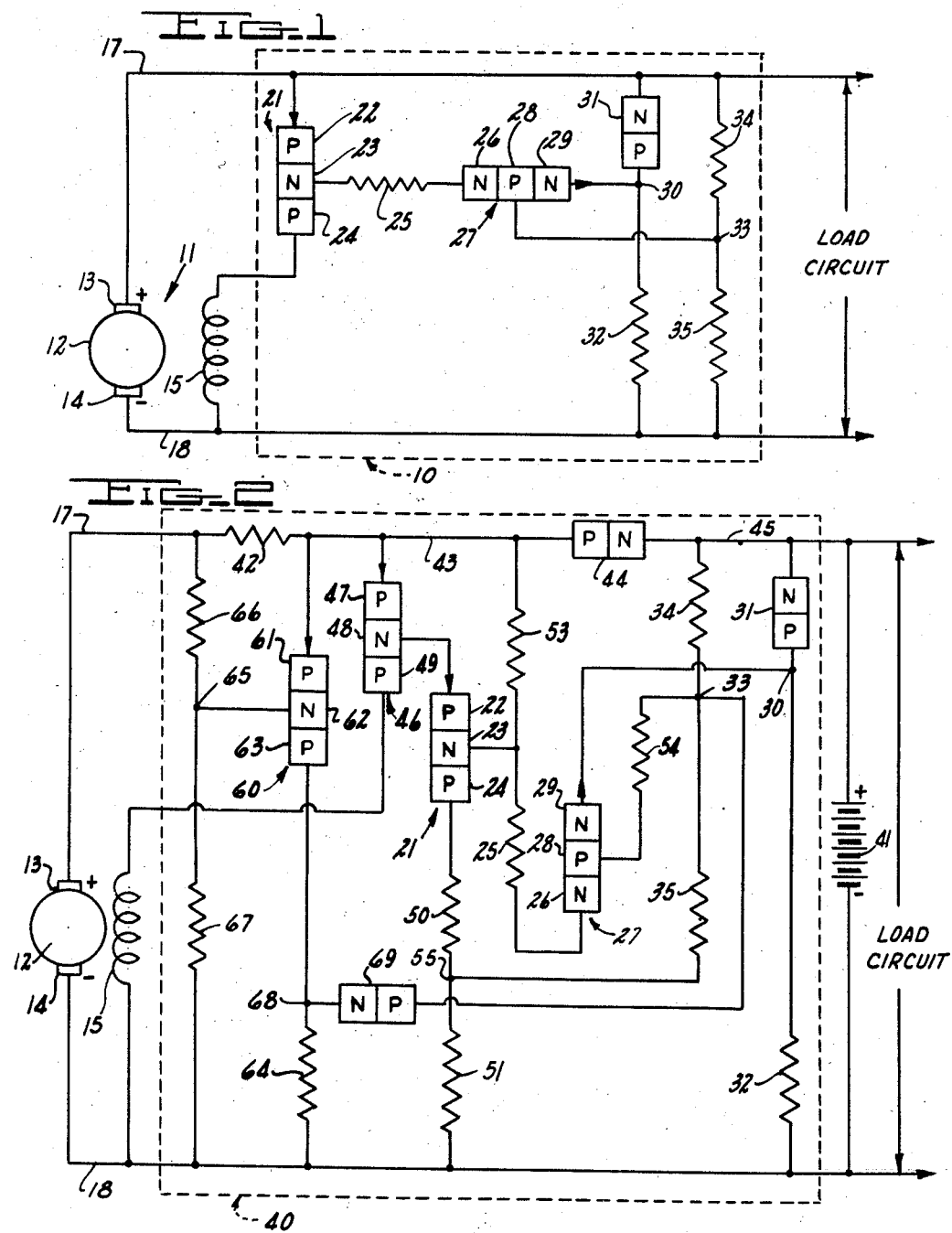

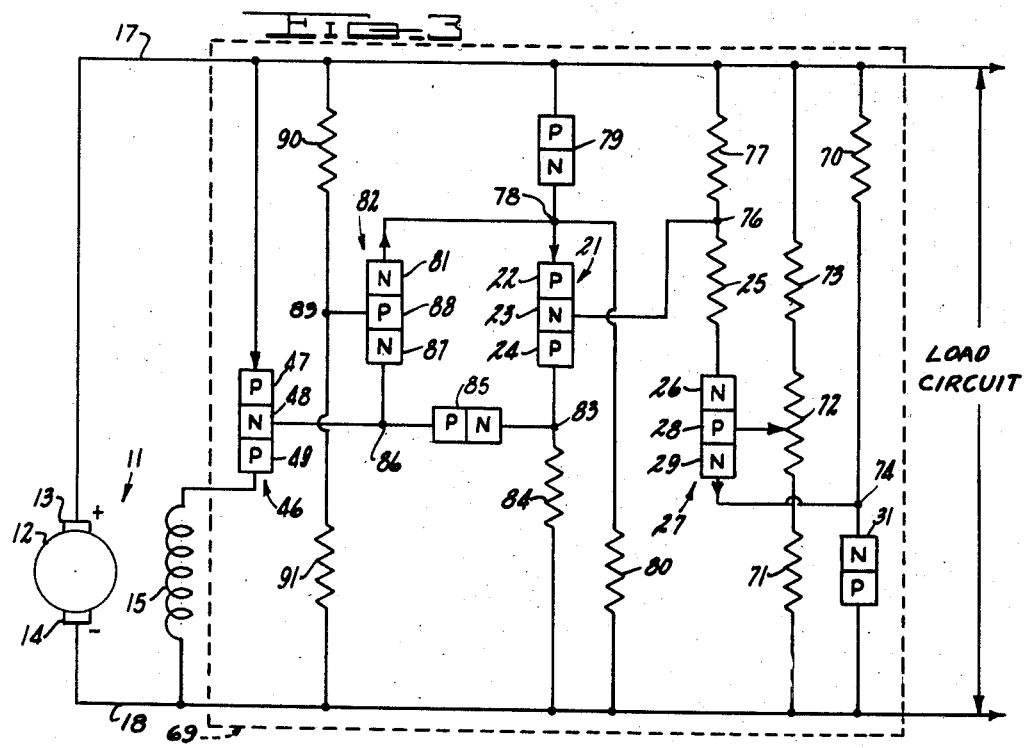
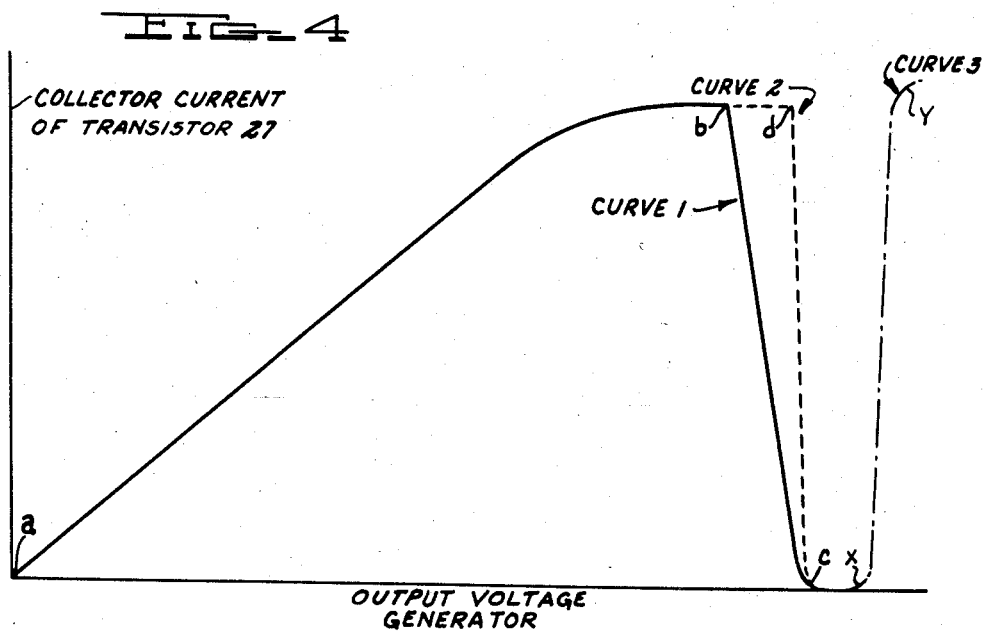

United States Patent Office 2,892,143
Patented June 23, 1959

2,892,143

GENERATOR REGULATING APPARATUS

Robert D. Sommer, Fort Wayne, Ind., assignor to Essex Wire Corporation, Fort Wayne, Ind.

Application November 7, 1957, Serial No. 694,966

7 Claims. (Cl. 322—28)

My invention relates to generator regulating apparatus and particularly to an improved regulating apparatus wherein semi-conductor devices are used to control and regulate the output of an electric generator. Although the improved regulating apparatus is especially applicable for use with the low voltage generator of an automotive vehicle, it will be understood that the improved regulating apparatus is also applicable to other types of electrical systems.

Conventional electrical power supply systems presently employed in automotive vehicles comprise a low voltage direct-current generator of the shunt field type driven by the engine of the vehicle, a storage battery to supply electrical energy when no or insufficient electrical energy is available from the generator, and a regulator unit consisting of three electromagnetic relays connected in a well-known manner. The regulator unit is effective to complete a circuit between the battery and the generator when the generator voltage is higher than the battery voltage, and is effective to interrupt the circuit when the battery current discharges through the generator. The regulator unit also operates to maintain the terminal voltage of the generator substantially constant and to limit the current output of the generator to a predetermined value.

A very serious limitation of the above mentioned three relay regulator unit lies in the deterioration of the relay contacts. One set of contacts carry the full current output of the generator and tend to stick or weld together. Other sets of contacts not only carry a substantial current but operate in a vibratory manner in a highly inductive circuit. The effective contact life is short and the three relay regulator unit often fails with resulting serious damage to the generator, the battery, or connected electrical equipment.

Accordingly, an object of my invention is to provide an improved apparatus for controlling and regulating the output of an electrical generator.

Another object of my invention to provide a generator regulating apparatus employing no electromagnetic relays or other moving parts.

Another object of my invention is to provide a generator regulating apparatus which will precisely and accurately control the output voltage of a generator.

Another object of my invention is to provide a transistor circuit for controlling the output of an electrical generator which is substantially independent of ambient temperature variations.

Another object of my invention is to provide an electronic generator regulating apparatus which is energized solely by the low voltage output of the generator which it regulates.

Another object is to provide a generator regulating apparatus which can be easily and economically adjusted and which will remain precisely adjusted.

Other objects and advantages, and a fuller understanding of the invention may be had by referring to the following description and claims, taken in connection with the accompanying drawings in which:

Figure 1 is an electric circuit diagram showing a generator regulating system embodying the present invention.

Figure 2 is an electric circuit diagram showing a modified form of such regulating system.

Figure 3 is an electric circuit diagram showing another modified form of such regulating system.

Figure 4 is a graph showing conditions during operation of such regulating systems.

Referring to Fig. 1, there is shown a voltage regulating apparatus 10 adapted for use with a direct current, self-excited generator 11 driven by a variable speed device such as the engine of an automotive vehicle. The generator 11, for example, a 15-volt generator, has an armature 12, a positive output terminal 13, a negative output terminal 14, and a shunt field winding 15. A load circuit such as the battery, lamps, motors, and other electrical equipment of an automotive vehicle is connected to the output terminals 13 and 14 by leads 17 and 18.

All electrical power required by the voltage regulating apparatus 10 is supplied through conductors 17 and 18 from the output of the generator 11. A junction power transistor 21 shown as a PNP transistor, comprising an emitter 22, a base 23, and a collector 24, has its emitter 22 connected to conductor 17. Collector 24 of transistor 21 is connected through the field winding 15 to conductor 18. The base 23 of transistor 21 is connected through resistor 25 to the collector 26 of a junction transistor 27 of the NPN type. Transistor 27 also includes a base 28 and an emitter 29. Base 28 is connected to a junction 33 between resistors 34 and 35 which are connected in series across conductors 17 and 18. Emitter 29 is connected to a junction 30 between a p–n junction diode 31 and a resistor 32 which are connected in series across conductors 17 and 18.

The voltage impressed between the emitter 29 and the base 28 of transistor 27 will be equal to the difference between the voltage across the diode 31 and the voltage across resistor 34. Diode 31 which serves as a constant potential reference is selected to have a zener breakdown voltage less than the regulated output voltage of the generator 12. Resistor 32 limits the current through diode 31 to a value which will not damage the diode 31. The values of resistors 34 and 35 are seleced to provide a voltage across resistor 34 which is substantially equal to that across diode 31 when the generator voltage has the desired regulated value.

When the armature 12 begins to rotate, the residual magnetism of the field winding 15 produces a small output voltage at the armature terminals 13 and 14 and across conductors 17 and 18. This voltage is usually less than the zener breakdown voltage of diode 31 and substantially the entire generator voltage will appear across diode 31. As only a portion of the generator voltage appears across resistor 34, the base potential of transistor 27 will be positive in respect to the potential of the emitter 29; and current will flow from conductor 17 through emitter 22, base 23 of transistor 21, and resistor 25 to the collector 26 of transistor 27, from collector 26 to emitter 29, and thence through resistor 32 to conductor 18. Base current flow through transistor 21 allows current to flow in the collector circuit of transistor 21 and through field winding 15 thereby increasing the generator output voltage.

Because the base 28 remains substantially positive with respect to the emitter 29 until the generator voltage approaches the desired regulated value, a substantial current will flow in the collector circuit of transistor 27 and the base circuit of transistor 21 allowing the current flow in the collector circuit of transistor 21 and in the field winding 15 to increase as the generator voltage increases.

The output voltage of the generator 11 continues to increase until the voltage across resistor 34 is almost equal to the reference voltage across diode 31. At this point, the voltage between the emitter 29 and the base 28 of transistor 27 is reduced enough to cause the collector current of transistor 27 to decrease from a maximum value determined by the value of the reference voltage of diode 31 and the resistance of resistor 25. Upon a further increase in generator voltage of only a few tenths of a volt, the base 28 becomes negative with respect to the emitter 29 to drive transistor 27 into a cutoff or non-conducting state.

Curve 1 in the graph of Figure 4 shows the relationship between the generator voltage and the collector current of transistor 27. As the generator voltage increases, the collector current initially increases in a substantially linear manner from near point $a$ and then, as diode 31 becomes conductive, levels off until at point $b$ the current drops abruptly to a minimum value at point $c$. The current in the collector circuit of transistor 21 and in the field winding 15 will also vary with the generator voltage in a similar manner since the extent to which transistor conducts depends upon the value of its base current which is equal to the collector current of transistor 27. Under normal conditions of generator speed and load, the generator voltage will be regulated between voltages corresponding to points $b$ and $c$ of Figure 4. As can be seen from Figure 4, the regulated voltage will vary by a small amount depending upon the value of field current required to maintain the generator voltage within the regulated range. For example, the regulated generator voltage will be slightly higher at low current loads or high generator speeds than at high current loads or low generator speeds.

Figure 2 is a modification of Figure 1 in which the regulating apparatus 40 not only controls the generator voltage but also provides means to limit the current output of the generator 11 and to prevent the discharge of battery current through the generator 11. The voltage regulating portion of the regulating apparatus 40 is generally similar to the voltage regulating apparatus 10 of Figure 1 and operates substantially in the same manner described for Figure 1. The parts of Figure 2 which correspond to the components of Figure 1 have been identified by the same numerals.

In Figure 2 a battery 41 and the load circuit are connected to the generator negative terminal 14 by conductor 18 and to the generator positive terminal 13 by a circuit comprising conductor 17, resistor 42_, conductor 43, a power p–n junction diode 44, and conductor 45. Power diode 44 is connected so that the generator current will flow through it in the forward direction to battery 41 and the load circuit when the generator voltage across conductors 43 and 18 is greater than the voltage across conductors 45 and 18. Diode 44 will block the discharge of battery current into the generator circuit as such current cannot flow in the reverse direction of diode 44. Power diode 44 obviously must have a current rating equal to or greater than the maximum output delivered by the generator 11.

In addition to transistors 21 and 27, the voltage regulating portion of the regulating apparatus employs a third junction transistor 46 of the PNP type comprising an emitter 47, a base 48, and a collector 49. The collector current of transistor 27 is limited to a value substantially less than the reverse current which flows through diode 31, and a two stage transistor amplifier employing transistors 21 and 46 is necessary to make possible the regulation of the high field current required by the high output generators commonly used in automotive vehicles. Emitter 47 is connected to conductor 43 and the collector 49 is connected through field winding 15 to conductor 18. The base 48 is connected directly to the emitter 22 of of transistor 21. Collector 24 is connected through resistors 50 and 51 to conductor 18. The base 23 of transistor 21 is connected to a junction 52 between resistors 53 and 25 which are connected in series between conductor 43 and the collector 26 of transistor 27. Resistor 53 insures that transistor 21 will be substantially cut off when no current flows through resistor 25. The base 28 of transistor 27 is connected through a current-limiting resistor 54 to the junction 33 between resistors 34 and 35 which are connected in series between conductor 45 and a junction 55 between resistors 50 and 51. The emitter 29 is connected to the junction 30 between diode 31 and resistor 32.

Resistor 34 and diode 31 are preferably connected to conductor 45 on the load circuit side of diode 44 such that changes in voltage drop across diode 44 will not affect the regulated voltage supplied to the battery 41 and the load circuit by conductors 45 and 18. Resistor 35 is connected to the junction 55 to minimize the variation in generator regulated voltage as the field current varies. Resistor 51 is selected to have a low resistance value compared to the resistance of the voltage divider resistors 34 and 35 such that the voltage across resistor 34 is primarily proportional to the generator output voltage but will also depend to a lesser extent upon the value of the collector current of transistor 21.

The operation of the voltage regulating circuit of Figure 2 is generally similar to that of Figure 1. However, when the collector current of transistor 21 is high, a substantial potential drop appears across resistor 51 which reduces the proportion of the generator voltage appearing across resistor 34. Therefore, it is necessary that the output voltage of the generator 11 increase to a somewhat higher value than in the circuit of Figure 1 before the collector current of transistor 27 begins to decrease from a maximum value toward a minimum value in the regulated range. This is illustrated in the graph of Figure 4 by a dotted extension of the curve 1 labeled curve 2 to point $d$ and thence to point $c$. Because the potential drop across resistor 51 is very small when the collector current of transistor is at its minimum value, the collector current of transistor 27 will have its minimum value at substantially the same value of generator output voltage as in the circuit of Figure 1. It can be readily seen that for substantially the same variation in collector current of transistor 27, the generator voltage regulated range of Figure 2 will be within much narrower limits than that of Figure 1.

A PNP junction transistor 60 is employed to provide current regulation in the circuit of Figure 2. Transistor 60, comprising an emitter 61, a base 62, and a collector 63, has its emitter 61 connected to conductor 43. Collector 63 is connected at junction 68 through resistor 64 to conductor 18. Base 62 is connected to a junction 65 between resistors 66 and 67 which are connected in series across conductors 17 and 18. A p-n junction diode 69 is connected between junction 68 and junction 33 such that current can flow through it in the forward direction from junction 33 to junction 68 whenever the collector-emitter voltage of transistor 64 is greater than the voltage across resistor 34.

In operation of the current regulating circuit portion of Figure 2, there is impressed between the emitter 61 and the base 62 of transistor 60 a voltage equal to the difference between the potential drop across resistor 42 which varies in accordance with the generator output current and a potential drop across resistor 66 which is normally substantially constant, being proportional to the regulated generator voltage. With normal values of generator output current, the voltage drop across resistor 42 is sufficiently less than the voltage across resistor 66 such that base 62 is substantially negative with respect to the emitter 61, and a substantial collector current flows through resistor 64 to maintain the emitter-collector voltage of transistor 60 at a value less than the voltage appearing across resistor 34.

If the generator output current should increase, the increased voltage drop across resistor 42 makes the base 62 of transistor 60 less negative with respect to the emitter 61 to cause a decrease in collector current of transistor 60. The emitter-collector voltage of transistor 60 is thus increased and at a specified value of generator output current becomes greater than the voltage normally appearing across resistor 34. Diode 69 is then biased in the forward direction to apply the greater emitter-collector voltage of transistor 60 across resistor 34. Transistor 27 is therefore biased to cause a reduction in its collector current which acts to reduce the generator field current, thereby reducing the generator voltage to effect a reduction in the current drawn from the generator until the emitter-collector voltage of transistor 60 decreases to a value less than the voltage across the zener diode 31.

In a constructed embodiment of Figure 2 for use with a 15 volt, D.C., 20 ampere generator having a field winding resistance of 20 ohms, a germanium rectifier having a 26 volt A.C., 20 ampere rating was used for diode 44. The following transistors, diodes, and values of resistances were used:

| | | |
|---|---|---|
| Transistor 21 | type | 2N85 |
| Transistor 27 | do | 2N78 |
| Transistor 46 | do | 2N101 |
| Transistor 60 | do | 2N65 |
| Diode 31 | do | 1N42 |
| Diode 69 | do | TI-604C |
| Resistor 25 | ohms | 2200 |
| Resistor 32 | do | 1000 |
| Resistor 34 | do | 2400 |
| Resistor 35 | do | 3000 |
| Resistor 42 | do | 0.002 |
| Resistor 50 | do | 180 |
| Resistor 51 | do | 25 |
| Resistor 53 | do | 10000 |
| Resistor 54 | do | 15000 |
| Resistor 64 | do | 1800 |
| Resistor 66 | do | 75 |
| Resistor 67 | do | 2200 |

Figure 3 is a temperature compensated form of Figure 1 which is suitable for regulating an automotive generator over the wide range of temperature encountered underneath the hood of an automotive vehicle. The temperature compensating means of Figure 3 are utilized to eliminate the undesirable effects of abient temperature changes of transistor characteristics and simultaneously give the regulator the desired voltage-temperature characteristics. Because the internal resistance of a battery will vary inversely with temperature, it is desirable to boost the generator voltage at low temperatures and decrease it at high temperatures.

The regulating apparatus 69 of Figure 3 is in some respects similar to Figures 1 and 2, and the same numerals have been used to identify components identical to those of Figures 1 and 2. Figure 3 differs primarily from the voltage regulating portion of Figure 2 in that transistors 21 and 27 are in the non-conducting state until the generator voltage approaches its regulated value. The zener diode 31 is connected in series with a temperature compensating resistor 70 having a negative temperature coefficient. A voltage divider network is also connected across conductors 17 and 18, and comprises in series resistor 71, potentiometer 72, and temperature compensating resistor 73 having a negative temperature coefficient. Transistor 27 has its base 28 connected to the variable tap of potentiometer 72 and its emitter connected to a junction 74 between diode 31 and resistor 70. The collector 26 is connected through resistor 25 to a junction 76 between the base 23 of transistor 21 and temperature compensating resistor 77 having a negative temperature coefficient. The emitter 22 of transistor 21 is connected to a junction 78 between a p-n junction diode 79, resistor 80, and the emitter 81 of a NPN junction transistor 82. Diode 79 is connected so that current flows through it in the forward or low resistance direction. Collector 24 of transistor 21 is connected to junction 83 between resistor 84 and diode 85. Diode 85 is connected so that current flows through it in the forward or low resistance direction from junction 86 between the base 48 of transistor 46 and the collector 87 of transistor 82. Transistor 46 has its emitter 48 connected to conductor 17 and its collector 49 connected through field winding 15 to conductor 18. The base 88 of transistor 82 is connected to a junction 89 between resistors 90 and 91.

At generator voltages below the desired regulated value, the voltage across the zener diode 31 will be greater than the potential drop across resistor 71 and a portion of potentiometer 72 such that the base potential of transistor 27 will be negative with respect to the emitter 29 and transistor 27 will be non-conductive. Transistor 21 will also be non-conductive since the small potential drop across diode 79 resulting from current flow through diode 79 and resistor 80 is sufficient to maintain transistor 21 cut-off with no current flow in the collector circuit of transistor 27. At high temperatures with a zero emitter-base potential, transistor 21 may have a substantial collector leakage current and it is necessary to use diode 79 or an equivalent low voltage biasing means to insure that the collector current of transistor 21 will have an acceptable minimum value.

With transistor 21 cut-off, all the current flowing through resistor 84 is effective as the base current of transistor 46 flowing through diode 85. Base current flow in transistor 46 allows current to flow in the collector circuit of transistor 46 and through the field winding 15 thereby allowing the generator output voltage to build up. Transistor 27 will remain cut off until the generator voltage increases sufficiently to cause the potential drop across resistor 71 and a portion of potentiometer 72 to be equal to the reference potential of diode 31. At this point, transistor 27 commences to conduct and an increasingly great collector current flows as the generator voltage rises. As transistor 27 becomes conductive, part of its collector current flows into the base 23 of transistor 21 causing the collector current of transistor 21 to flow through resistor 85. This acts to reduce the base current of transistor 46 which also flows through the common resistor 85, thereby reducing the collector current of transistor 46 through the field winding 15. This decrease in field current acts to prevent the generator voltage from exceeding a regulated value as any further increase in generator voltage produces a corresponding reduction in generator field current.

The relation of the collector current of transistor 27 to the generator voltage is illustrated by curve 3 in the graph of Figure 4 where it can be seen that transistor 27 is non-conductive until at point $x$ the collector current abruptly rises with only a very small increase in generator voltage. To provide regulation of the generator voltage over narrow limits, it is desirable that the collector current of transistor 46 attain its minimum value while the collector current of transistor 27 is below the bend $y$ at the upper part of the curve. For clarity, the regulating range of Figure 3 is shown to occur at a voltage greater than that of Figures 1 and 2 but it is obvious that potentiometer 72 can be adjusted to shift the regulating range.

The temperature compensating resistor 73 is effective to increase the regulated voltage at lower temperatures and to decrease the regulated voltage at higher temperatures. The negative temperature coefficient of resistor 73 causes the proportion of the generator voltage appearing across resistor 71 and a portion of potentiometer to vary directly with temperature. Temperature compensating resistor 70 is employed to maintain the current through the zener diode 31 at a substantially constant value as the regulated generator voltage varies with temperature.

Temperature compensating resistor 77 serves to fix the potential of base 23 in respect to conductor 17 and to prevent the collector current of transistor 27 from flowing in the base circuit of transistor 21 until it increases above the non-linear value at the lower bend red point $x$ illustrated in Figure 4. At high temperatures resistor 77 has a low resistance value such that the high collector leakage current of transistor 27 will not cause transistor 21 to conduct at voltages below the regulating range. However, at lower temperatures where the generator regulated voltage is greater, resistor 77 has a substantially higher resistance value so that substantially all the collector current of transistor 27 is effective in the base circuit of transistor 27 to permit transistor 21 to conduct the relatively higher current flowing through resistor 85 resulting from the higher generator voltage.

Even with transistor 21 conducting to its fullest extent, the potential drop across diode 79 and the emitter-collector voltage drop of transistor 21 combine to make the collector voltage of transistor 21 substantially negative with respect to the emitter 47 of transistor 46. If collector 24 of transistor 21 was directly coupled to the base 48 of transistor 46, the base and collector currents of transistor 46 could not be reduced to low values. The voltage drop across diode 85 is sufficient to limit the base current of transistor 46 to a negligible value when the collector voltage of transistor 21 has its minimum value. The voltage drop across diode 85 will increase only a fraction of a volt with much greater currents in the base circuit of transistor 46.

The voltage drop across diode 85 may block any significant current flow in the base circuit of transistor 46 at low generator output voltages developed solely by the residual magnetism of the field winding 15. It is therefore necessary to employ a shunting circuit to bypass diode 85 at low generator voltages in order that the generator voltage may build up. At such low voltages, substantially all the generator voltage will appear across diode 79 while only a fraction of the generator voltage will be across resistor 90. The base 88 of transistor 82 will be positive in respect to the emitter 89, and transistor 82 is conductive to permit base current to flow from base 48 of transistor 46 through transistor 82 and resistor 80 to conductor 18. Transistor 46 conducts to its fullest extent and the generator voltage builds up. As the output voltage of generator 11 increases, the voltage drop across resistor 90 becomes greater than the potential drop across diode 79 to reverse the emitter-base voltage of transistor 82 and cut off transistor 82. Transistor 82, being cut off, now has no effect in the base circuit of transistor 46; but since the generator voltage is now great enough to allow a substantial current to flow through diode 85, the generator voltage will continue to build up until it reaches its regulated value.

In a constructed embodiment of Figure 3 for use with a 15 volt D.-C., 30 ampere generator having a field winding resistance of 7.5 ohms, diode 31 comprised a type 1N429 silicon diode (6.4 zener volts) and a type TI–651 silicon diode (5.0 zener volts), diode 85 comprised two type TI–604 silicon diodes conducted in series, and diode 79 was a single type 1N437 silicon diode. The following transistors and values of resistance were used:

| | | |
|---|---|---|
| Transistor 21 | type | H–2 |
| Transistor 27 | do | 2N78 |
| Transistor 46 | do | P–11 |
| Transistor 82 | do | 2N78 |
| Resistor 25 | ohms | 47 |
| Resistor 70 | ohms (25° C.) | 200 |
| Resistor 71 | ohms | 20 |
| Potentiometer 72 | do | 25 |
| Resistor 73 | ohms (25° C.) | 38 |
| Resistor 77 | ohms (25° C.) | 3150 |
| Resistor 80 | ohms | 470 |
| Resistor 84 | do | 100 |
| Resistor 90 | do | 47 |
| Resistor 91 | do | 470 |

While certain specific embodiments of my invention have been shown and described for the purpose of illustration, various modifications may be made, and it is intended to cover such modifications as fall within the true spirit and scope of my invention.

I claim as my invention:

1. A regulating system for a generator having positive and negative output terminals and an exciting winding comprising: first, second, and third transistors each having an emitter, a base, and a collector; said transistors being of the n–p–n and p–n–p types, said first transistor being of one of said types and said second and third transistors being of the other of said types; a current path connected across said generator terminals comprising in series a first resistor and a first p–n junction diode; means for connecting the emitter of said first transistor to the junction of said first diode and said first resistor; a resistance path connected across said generator terminals having a terminal intermediate said generator terminals; means for connecting the base of said first transistor to said intermediate terminal of said resistance path; means comprising a second resistor for connecting the collector of said first transistor to the base of said second transistor; means comprising a third resistor for connecting the base of said second transistor to one of said generator terminals; means comprising a second p–n junction diode for connecting the emitter of said second transistor to said one of said generator terminals; means comprising a fourth resistor for connecting the emitter of said second transistor to the other of said generator terminals; means including a fifth resistor for connecting the collector of said second transistor to said other of said generator terminals; means comprising a third p–n junction having a greater forward resistance than has said second diode for connecting the collector of said second transistor to the base of said third transistor; means for connecting the emitter of said third transistor to said one of said generator terminals; and means comprising said exciting winding for connecting the collector of said third transistor to said other of said generator terminals.

2. The regulating system of claim 1 including: a fourth transistor of the same type as said first transistor having an emitter, a base, and a collector; a second resistance path connected across said generator terminals having a terminal intermediate said generator terminals; means for connecting the base of said fourth transistor to said intermediate terminal of said second resistance path; means for connecting the emitter of said fourth transistor to the emitter of said second transistor; and means for connecting the collector of said fourth transistor to the base of said third transistor.

3. The regulating system of claim 1 wherein the resistance values of said first resistor, a portion of said resistance path, and said third resistor vary in response to ambient temperature changes.

4. In a regulating system for an electrical generator having output terminals and an exciting winding comprising a first transistor having emitter, base and collector electrodes, the emitter of the first transistor being connected to one of said output terminals, the collector of the first transistor being connected through said exciting winding to the other of said output terminals and voltage-responsive means connected to said output terminals and providing a D.-C. current variable in response to the voltage across said output terminals; transistor-amplifying means having input terminals connected to said voltage responsive means and having output terminals connected to said first transistor, said transistor-amplifying means including a second transistor having emitter, base and collector electrodes, a first resistor connecting the base of the second transistor to said one output terminal, means connecting the base of the second transistor to said voltage-responsive means to cause said variable current to apply a bias to said base, biasing means connecting the emitter of the second transistor to said one output terminal to apply a bias to the emitter, a second resistor connecting the collector of the second transistor to said other output terminal, and a diode connecting the collector of the second transistor to the base of the first transistor, said diode being connected for current flow through it in the forward or low-resistance direction.

5. The transistor-amplifying means according to claim 4 wherein the resistance value of said first resistor varies inversely in response to ambient temperature changes.

6. The transistor-amplifying means according to claim 4 wherein said biasing means comprise a diode connected between said one output terminal and the emitter of said second transistor, and a resistor connected between said other output terminal and the emitter of said second transistor.

7. The transistor-amplifying means according to claim 4 and including means for increasing the base current of said first transistor when the output voltage of said generator is low, said means comprising a third transistor having emitter, base and collector electrodes, a resistance path connected across said output terminals and having a terminal intermediate said output terminals, the base of the third transistor being connected to said intermediate terminal, the collector of the third transisor being connected to the base of said first transistor and the emitter of the third transistor being connected to the emitter of said second transistor.

References Cited in the file of this patent

UNITED STATES PATENTS

| | | |
|---|---|---|
| 2,751,545 | Chase | June 19, 1956 |
| 2,751,549 | Chase | June 19, 1956 |
| 2,809,301 | Short | Oct. 18, 1957 |